(12) United States Patent
Hung et al.

(10) Patent No.: US 11,847,770 B2
(45) Date of Patent: *Dec. 19, 2023

(54) AUTOMATIC GENERATION OF ALL-IN-FOCUS IMAGES WITH A MOBILE CAMERA

(71) Applicant: Google LLC, Mountain View, CA (US)

(72) Inventors: Szepo Robert Hung, Santa Clara, CA (US); Ying Chen Lou, Santa Clara, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/628,871

(22) PCT Filed: Jun. 12, 2020

(86) PCT No.: PCT/US2020/037434
§ 371 (c)(1),
(2) Date: Jan. 20, 2022

(87) PCT Pub. No.: WO2021/066894
PCT Pub. Date: Apr. 8, 2021

(65) Prior Publication Data
US 2022/0180492 A1    Jun. 9, 2022

Related U.S. Application Data

(63) Continuation of application No. 16/589,025, filed on Sep. 30, 2019, now Pat. No. 10,984,513.

(51) Int. Cl.
*G06T 5/50* (2006.01)
*G03B 13/36* (2021.01)
(Continued)

(52) U.S. Cl.
CPC ............ *G06T 5/50* (2013.01); *G03B 13/36* (2013.01); *G06T 5/003* (2013.01); *H04N 23/676* (2023.01);
(Continued)

(58) Field of Classification Search
CPC ......... H04N 5/232133; H04N 5/23229; H04N 5/232125; H04N 23/676; H04N 23/80;
(Continued)

(56) References Cited

U.S. PATENT DOCUMENTS 9,704,250 B1    7/2017  Shah et al.
10,984,513 B1*  4/2021  Hung .................. G06T 5/50
(Continued)

FOREIGN PATENT DOCUMENTS

CN    102984530    3/2013
CN    103002218    3/2013
(Continued)

OTHER PUBLICATIONS

"Improving Autofocus Speed in Macrophotography Applications", Technical Disclosure Commons—https://www.tdcommons.org/dpubs_series/5133, May 11, 2022, 9 pages.
(Continued)

*Primary Examiner* — Timothy J Henn
(74) *Attorney, Agent, or Firm* — McDonnell Boehnen Hulbert & Berghoff LLP

(57) ABSTRACT

The present disclosure describes systems and techniques directed to producing an all-in-focus image with a camera of a mobile device, in particular, cameras with shallow depth-of-field. User equipment includes a sensor for determining distance to an object in a camera's field-of-view. Based on a depth map of the field-of-view, a plurality of segments is inferred, each segment defining a unique focus area within the camera's field-of-view. An autofocus lens of the camera
(Continued)

sweeps to a respective focal distance associated with each of the plurality of segments. The camera captures sample images at each focal distance swept by the autofocus lens. The user equipment produces an all-in-focus image by combining or merging portions of the captured sample images.

18 Claims, 16 Drawing Sheets

(51) Int. Cl.
*G06T 5/00* (2006.01)
*H04N 23/80* (2023.01)
*H04N 23/67* (2023.01)
*H04N 23/959* (2023.01)

(52) U.S. Cl.
CPC .......... *H04N 23/80* (2023.01); *H04N 23/959* (2023.01); *G06T 2207/10148* (2013.01); *G06T 2207/20221* (2013.01)

(58) Field of Classification Search
CPC .. H04N 23/959; H04N 23/673; H04N 23/672; G06T 5/50; G06T 5/003; G06T 2207/10148; G06T 2207/20221; G06T 7/11; G06T 7/50; G03B 13/36
See application file for complete search history.

(56) References Cited

U.S. PATENT DOCUMENTS

| | | | |
|---|---|---|---|
| 2009/0303343 A1 | 12/2009 | Drimbarean et al. | |
| 2011/0267499 A1 | 11/2011 | Wan et al. | |
| 2012/0154579 A1 | 6/2012 | Hampapur et al. | |
| 2013/0177203 A1 | 7/2013 | Koo et al. | |
| 2013/0314558 A1 | 11/2013 | Ju et al. | |
| 2015/0279012 A1* | 10/2015 | Brown | G06T 5/50 382/284 |
| 2016/0112637 A1 | 4/2016 | Laroia et al. | |
| 2016/0117798 A1 | 4/2016 | Lin et al. | |
| 2016/0248968 A1 | 8/2016 | Baldwin | |
| 2016/0248979 A1 | 8/2016 | Israel et al. | |
| 2016/0360091 A1 | 12/2016 | Lindskog et al. | |
| 2017/0053167 A1 | 2/2017 | Ren et al. | |
| 2018/0077210 A1 | 3/2018 | Hannuksela et al. | |
| 2019/0132520 A1 | 5/2019 | Gupta et al. | |
| 2021/0329150 A1 | 10/2021 | Wang et al. | |

FOREIGN PATENT DOCUMENTS

| | | |
|---|---|---|
| CN | 105474622 | 4/2016 |
| CN | 106134176 | 11/2016 |
| CN | 106412426 | 2/2017 |
| CN | 107787463 | 3/2018 |
| WO | 2021066894 | 4/2021 |

OTHER PUBLICATIONS

"International Preliminary Report on Patentability", Application No. PCT/US2020/037434, dated Apr. 5, 2022, 8 pages.

Hollister, "How to guarantee the iPhone 13 Pro's macro mode is on", Retrieved at: https://www.theverge.com/22745578/iphone-13-pro-macro-mode-how-to, Oct. 26, 2021, 11 pages.

Konstantinova, et al., "Fingertip Proximity Sensor with Realtime Visual-based Calibration*", Oct. 2016, 6 pages.

"Foreign Office Action", CN Application No. 202080019378.X, dated Oct. 24, 2022, 21 pages.

"International Search Report and Written Opinion", PCT Application No. PCT/US2020/037434, dated Sep. 23, 2020, 14 pages.

Chang, et al., "Low-light Image Restoration with Short-and-long-exposure Raw Pairs", Jul. 1, 2020, 12 pages.

Chen, et al., "Automatic Zoom Based on Image Saliency", Technical Disclosure Commons, https://www.tdcommons.org/dpubs_series/4640, Oct. 7, 2021, 11 pages.

Mustaniemi, et al., "LSD—Joint Denoising and Deblurring of Short and Long Exposure Images with CNNs", Sep. 1, 2020, 21 pages.

Shih, et al., "Techniques for Deblurring Faces in Images by Utilizing Multi-Camera Fusion", Technical Disclosure Commons—https://www.tdcommons.org/dpubs_series/4274, May 5, 2021, 9 pages.

Yang, et al., "Object Detection and Tracking with Post-Merge Motion Estimation", Technical Disclosure Commons, https://www.tdcommons.org/dpubs_series_4353, Jun. 8, 2021, 11 pages.

Yuan, et al., "Image Deblurring with Blurred/Noisy Image Pairs", Jul. 29, 2007, 10 pages.

* cited by examiner 600-3

Autofocus Lens Position A 600-4

Autofocus Lens Position B 600-5

Autofocus Lens Position C 600-6

Autofocus Lens Position D 600-7

Autofocus Lens Position E

AUTOMATIC GENERATION OF ALL-IN-FOCUS IMAGES WITH A MOBILE CAMERA

RELATED APPLICATION(S)

This application is a national stage entry of International Application No. PCT/US2020/037434, filed Jun. 12, 2020, which in turn claims priority to U.S. Utility application Ser. No. 16/589,025, filed Sep. 30, 2019, the disclosures of which are incorporated herein by reference in their entireties.

BACKGROUND

Cameras in mobile devices tend to have short focal lengths caused by the form factor of the mobile device in which each of the cameras resides. To provide excellent imaging even with a short focal length, many cameras in mobile devices (mobile cameras) use a shallow depth-of-field, which permits narrowly-focused pictures while allowing an object that is in focus to be sharpened while softening other parts of a scene. Such a quality makes mobile cameras well suited for producing portraits and artistic photography, with quality that rivals a digital single-lens reflex (DSLR) camera. This quality also gives mobile cameras broad consumer appeal.

A shallow depth-of-field, however, inhibits other kinds of photography, such as landscape photography, medical imagery, biometric imagery, commercial photography, and the like, where achieving a clear "all-in-focus" picture is more-desirable than focusing on a single area or object of a scene. A high-quality all-in-focus image includes multiple clearly-focused areas, or objects-of-interest, instead of just one, even if some are at different focal distances. Generating all-in-focus images using mobile camera technology with a shallow depth-of-field, however, has proven difficult, particularly given expectations for quick and responsive user experiences.

SUMMARY

This disclosure describes techniques and systems for automatic generation of all-in-focus images with a mobile camera. The techniques and systems enable user equipment (e.g., mobile phones, tablets) to capture all-in-focus images, despite having mobile cameras with a shallow depth-of-field. A user equipment's camera, using information from a depth sensor, contrast sensor, or phase-detection sensor, segments an image into a set of focal distances (also sometimes referred to as "depths"). Each focal distance corresponds to a different focus area or object of interest. The mobile camera captures a series of images by selectively sweeping an autofocus lens, such as a lens driven by a voice coil motor (VCM) or a microelectromechanical (MEMS) magnetic actuator, of the mobile camera to capture an image at each focal distance in the set. Individual focus areas from each of the images in the set are combined to form a single, all-in-focus image combining multiple focus areas in a single picture or scene. To improve performance of the mobile camera, and to ensure that the mobile camera produces all-in-focus images as quickly as possible, the mobile camera may reduce sweep time of the autofocus lens. Utilizing a buffer of images already taken to promote zero shutter lag (ZSL), the mobile camera can selectively avoid sweeping to a particular focal distance or depth that is associated with an existing image in the buffer. The mobile camera combines individual focus areas of previously buffered images with individual focus areas of newly captured images taken at the different focal distances or depths, to produce a single all-in-focus image. Mobile camera imaging may therefore be improved.

The system and techniques, therefore, enable automatic generation of all-in-focus images despite existing limitations of mobile cameras, including a shallow depth-of-field. User equipment that utilizes the described systems and techniques is still able to take narrowly-focused images that are comparable to images taken with a DSLR. Using the techniques, the same user equipment, even with a shallow depth-of-view, can also take all-in-focus landscapes and other pictures with multiple focus areas or objects-of-interest in clear, discernable view.

In some aspects, a method is described for producing an all-in-focus image with a camera of user equipment (called a "mobile camera" when the camera is integral with a mobile computing device). The method includes inferring, based on sensor data, a plurality of segments each defining a unique focus area within a field-of-view of the mobile camera, maintaining a set of focal distances corresponding to different segments from the plurality of segments, sweeping an autofocus lens of the mobile camera to one or more of the focal distances from the set of focal distances, and capturing a sample image at each of the one or more of the focal distances from the set of focal distances swept by the autofocus lens. The method further includes combining at least one of the sample images captured at the one or more focal distances swept by the autofocus lens with another image to produce the all-in-focus image, and outputting, for display, an indication of the all-in-focus image.

This document also describes computer-readable media having instructions for performing the above-summarized method and other methods set forth herein, as well as systems and means for performing these methods.

This summary is provided to introduce simplified concepts for automatic generation of all-in-focus images with a mobile camera, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of automatic generation of all-in-focus images with a mobile camera are described in this document with reference to the following drawings. The same numbers are used throughout the drawings to reference like features and components:

FIGS. 6-1 through 6-9 illustrate example screen-shots output for display, and image samples captured, when automatically producing all-in-focus images with a mobile camera.

FIGS. 7 and 8 illustrate example methods for automatic generation of all-in-focus images with a mobile camera.

DETAILED DESCRIPTION

Figure 1:
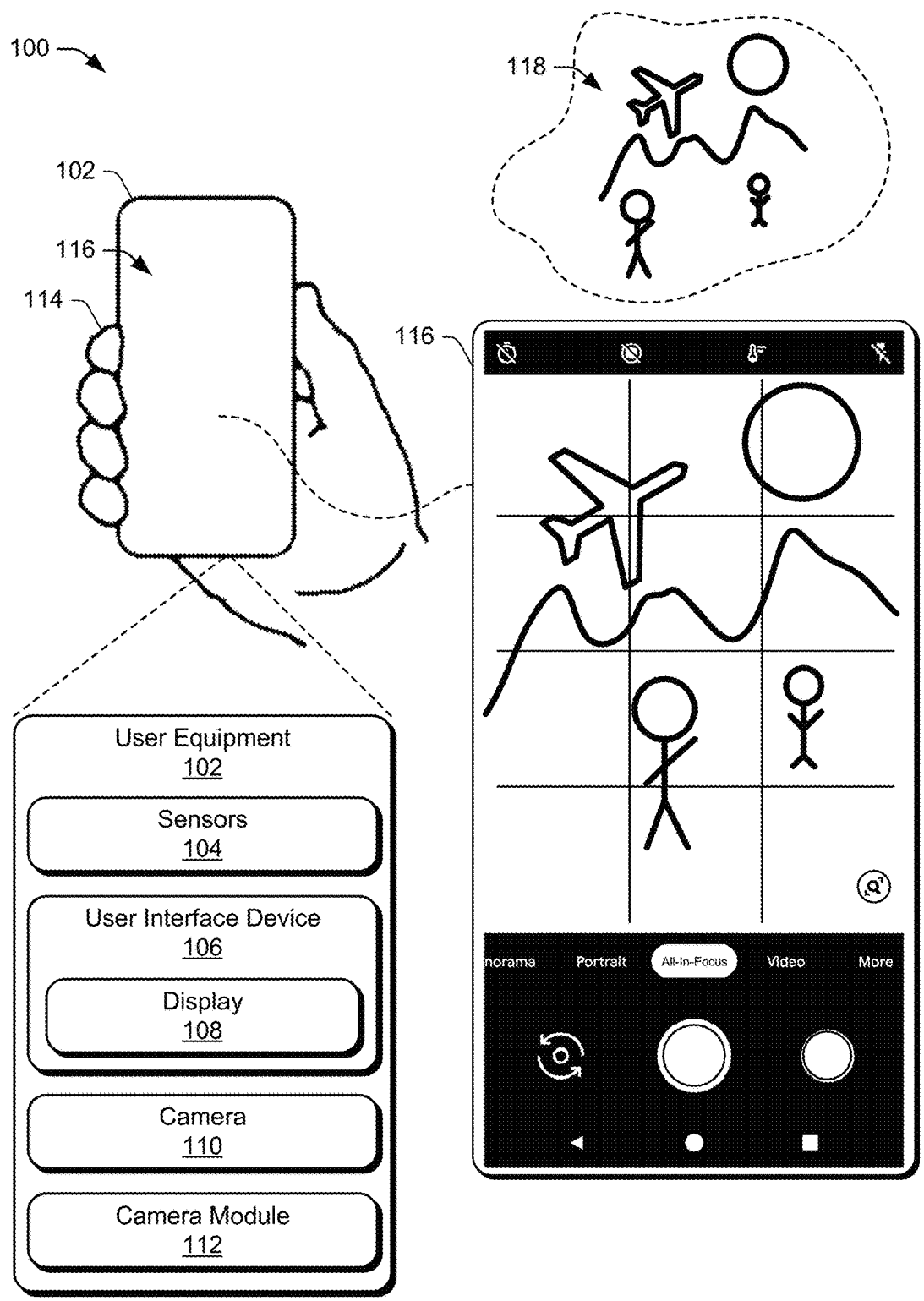
FIG. 1 illustrates an example environment in which techniques for automatic generation of all-in-focus images with a mobile camera can be implemented.

This document describes systems and techniques enabling production of all-in-focus images with a mobile camera. Aside from being adapted to produce narrowly-focused pictures that sharpen a particular area or object-of-interest in a scene, a mobile camera typically cannot create an all-in-focus image. Generating all-in-focus images (images in which objects or areas at different focal distances are all in focus) using mobile camera technology with a shallow depth-of-field can be difficult if not impossible, particularly given expectations for quick and responsive user experiences.

To enable mobile cameras to create all-in-focus images, user equipment is described including a depth sensor, a contrast sensor, or a phase-detection sensor. For example, the user equipment may include a mobile camera that includes a depth sensor for supporting augmented reality or facial recognition. Likewise, phase-detection sensors and contrast sensors can often be integrated into mobile cameras to perform phase-detection or contrast-detection autofocus. A sensor that is not integrated into the mobile camera can be used in some examples to generate sensor data for building a depth map as is described below. As one example, by aligning the mobile camera and a radar-based input system's field of view, the radar system of the user equipment can generate sensor data that goes into creating a depth map or three-dimensional perspective of the mobile camera's field-of-view.

Based on the sensor data, the user equipment produces a depth map or other representation of distance to objects in the mobile camera's field-of-view. The depth map indicates focal distances associated with different parts of a scene. The field-of-view can be conceptualized as a two-dimensional grid, each point in the grid defined by a unique pair of horizontal and vertical locations within the field-of-view. The depth map defines the focal distance between the mobile camera and a real-world object-of-interest that is present at a horizontal and vertical location, within the field-of-view. The depth map may encompass only part of a field-of-view, or the depth map can include an entire field-of-view, specifying the focal distance to any real-world object-of-interest that is present at any horizontal or vertical location, within the field-of-view. By representing distances to different objects in the field-of-view, the depth map can be considered to be indicative of one or more "segments", each segment associated with or defining an area of the field-of-view, each area associated with a different focal distance.

A plurality of segments is inferred from the sensor data and resulting depth map. For example, each segment is associated with a unique focus area within the mobile camera's field-of-view. Each location within a unique focus area is inferred to include objects-of-interest at similar focal distances. With two people in a mobile camera's field-of-view, for example, the plurality of segments may include a segment for each person, a segment for an object behind the people, and a segment for an object between the mobile camera and the people. Each segment is associated with a focal distance for that segment. The focal distance may be an average focal distance, a maximum focal distance, a minimum focal distance, or some other generalization of the different focal distances at the locations within the segment.

To create an all-in-focus image, an autofocus lens of the mobile camera sweeps to a respective focal distance associated with each of the plurality of segments. Continuing the two-person example, the autofocus lens sweeps to the focal distances associated with the segments of the two people, the foreground object, and the background object.

The mobile camera captures sample images at each focal distance swept by the autofocus lens. At the focal distance of a first person's segment, the mobile camera captures an image where the first person is the most in-focus object in the field-of-view. At the focal distance of the other person's segment, the mobile camera captures an image where the other person is the most in-focus object in the field-of-view. The mobile camera individually sweeps to the locations of the foreground and background objects as well, capturing in-focus pictures of the foreground and background objects, where each object is most in-focus when the autofocus lens sweeps to a focal distance of each of the object's respective segment.

The user equipment produces an all-in-focus image by combining portions of the captured sample images. The images taken at each of the different autofocus lens positions are layered, blended, or otherwise merged together so a respective in-focus portion of each of the images is more visible than other respective parts of the images.

The user equipment can output the all-in-focus image, or an indication of the image, for display to a user of the user equipment. For example, a camera user interface may include a selectable option to direct the mobile camera to take an all-in-focus picture or not. In response to determining that an all-in-focus image mode is selected, the user equipment automatically generates all-in-focus images when the user inputs a capture command.

These are but a few examples of how the described techniques and systems may be used to automatically generate all-in-focus images with a mobile camera. Other examples and implementations are described throughout this document.

FIG. 1 illustrates an example environment 100 in which techniques for automatic generation of all-in-focus images with a mobile camera can be implemented. The environment 100 includes a user 114 holding user equipment 102 to take a picture of a scene 118. In the example of FIG. 1, the scene 118 is of a mountain range with the sun and an airplane high in the background. Two people at different distances from the user equipment 102 are also visible in the lower half of the scene 118, in front of the mountain range.

The user equipment 102 (also sometimes referred to as a computing device) may be any type of mobile or non-mobile computing device with a camera, even though the techniques are described primarily in a mobile-device context. As a mobile computing device, the user equipment 102 can be a mobile phone, a laptop computer, a wearable device (e.g., watches, eyeglasses, headphones, clothing), a tablet device, an automotive/vehicular device, a portable gaming device, an electronic reader device, or a remote-control device, or other mobile computing device. As a non-mobile computing device, the user equipment 102 may be a doorbell, a thermostat, a refrigerator, a security system, a desktop computer, a television device, a display device, an entertainment set-top device, a streaming media device, a tabletop assistant device, a non-portable gaming device, business conferencing equipment, or other non-mobile computing device with a camera.

The user equipment 102 includes one or more sensors 104, a user interface device 106 including a display 108, a camera 110, and a camera module 112. These and other components of the user equipment 102 are communicatively coupled in various ways, including through wired and wireless buses and links. The computing device 100 may include additional or fewer components than what is shown in FIG. 1.

The user interface device 106 manages input and output to a user interface of the user equipment 102, such as input and output associated with a camera interface 116 that is managed by the camera module 112 for controlling the camera 110 to take pictures or record movies. For example, the user interface device 106 may receive instructions from the camera module 112 that cause the display 108 to present the camera interface 116. In response to presenting the camera interface 116, the user interface device 106 may send the camera module 112 information about user inputs detected by the user interface device 106 in relation to the camera interface 116.

The display 108 can be made from any suitable display technology, including LED, OLED, and LCD technologies. The display 108 may function as both an output device for displaying the camera interface 116, as well as an input device for detecting the user inputs associated with the camera interface 116. For example, the display 108 can be a presence-sensitive screen (e.g., a touchscreen) that generates information about user inputs detected at or near various locations of the display 108. The user interface device 106 may include a radar-based gesture detection system, an infrared-based gesture detection system, or an optical-based gesture detection system.

The camera 110 is configured to capture individual, or a burst of, still images as pictures or record moving images as movies (which is another, longer burst of still images). The camera 110 may include a single camera or multiple cameras. The camera 110 may be a front-facing camera configured to capture still images or record moving images from the perspective of the display 108. The camera 110 may be a rear-facing or side-facing camera configured to capture still images or record moving images from an alternative perspective than that of the display 108.

The camera 110 may have a short focal-length, like other mobile cameras, giving the camera 110 a shallow total depth-of-field. The shallow total depth-of-field enables the camera 110 to create narrowly focused pictures that sharpen in on a particular object-of-interest making the camera 110 well suited for producing portraits and artistic photography to rival DSLR and other types of camera equipment. The shallow depth-of-field of the camera 110, however, may inhibit other kinds of photography with the user equipment 102, such as landscape photography, medical imagery, biometric imagery, commercial photography, and the like, where achieving a clear "all-in-focus" picture is more-desirable than focusing on a single area or object of the scene 118.

The camera module 112 controls the camera 110 and the camera interface 116. The camera module 112 may be part of an operating system executing at the user equipment 102. In other examples, the camera module 112 may be a separate component (e.g., an application) executing within an application environment or "framework" provided by the operating system or partially or entirely as a driver or other low-level routine. The camera module 112 may be implemented in hardware, software, firmware, or a combination thereof. A processor of the user equipment 102 may execute instructions stored in a memory of the user equipment 102 to implement the functions described with respect to the camera module 112.

The camera module 112 exchanges information with the camera 110 and the user interface device 106 to cause the display 108 to present the camera interface 116. In response to user input associated with the camera interface 116, the camera module 112 processes the user input to adjust or manage the camera interface 116. FIG. 1 shows the camera interface 116 including a camera viewfinder for taking still photos or videos with the camera 110. In response to detecting input at a location of the display 108 where a graphical button associated with the camera interface 116 is displayed, the camera module 112 receives information about the detected input. The camera module 112 processes the detected input and in response to determining a capture command from the input, the camera module 112 sends a signal that causes the camera 110 to capture an image of the scene 118 that is within the field-of-view of the camera 110.

The one or more sensors 104 generally obtain contextual information indicative of a physical operating environment of the user equipment 102 or the user equipment 102's surroundings. With regard to generating all-in-focus images, the sensors 104 generate sensor data indicative of a distance between the camera 110 and objects in the scene 118 within the camera 110's field-of-view.

The camera 110 can include one or more of the sensors 104 or the sensors 104 may be separate components of the user equipment 102. The sensors 104 may include a depth sensor, a contrast sensor, or a phase-detection sensor, whether as a stand-alone sensor, or an integrated sensor within the camera 110. Additional examples of the sensors 104 include movement sensors, temperature sensors, position sensors, proximity sensors, ambient-light sensors, infrared dot projectors and infrared sensors, moisture sensors, pressure sensors, and the like.

The sensors 104 may include a depth sensor for obtaining depth information to support facial-recognition. The sensors 104 can include an infrared dot projector and infrared sensor configured as a depth sensor to determine whether contours of a face during a user authentication process match those of an authorized user.

During an augmented-reality experience, the sensors 104 can abstract the physical environment in the field-of-view of the camera 110. Using depth information obtained from the sensors 104, the user equipment 102 adjusts virtual objects that are presented on in the user interface 116 to appear to conform to physical objects or features at different depths of the field-of-view.

The sensors 104 can include phase-detection sensors or contrast sensors. Similar to a depth sensor, phase-detection sensors and contrast sensors are often integrated into mobile cameras to perform phase-detection or contrast-detection autofocus. Phase-detection autofocus is a very fast autofocus technique that uses multiple image sensors to sample a set of test images and then adjust lens elements of a camera until the test images converge and come in phase. Phase-detection autofocus differs from contrast-detection autofocus. In contrast detection, the camera adjusts the lens for maximum contrast at edges of an image.

Based on sensor data generated by the sensors 104, the camera module 112 automatically segments the mobile camera's field of view into multiple depths or focal distances, with each of the multiple depths or focal distances corresponding to a different area or object-of-interest from the scene 118. The camera module 112 determines a depth map of the camera 110's field-of-view. The depth map may include an array of points, with each point corresponding to a focal distance between the camera 110 and an object that is visible at a horizontal and vertical location within the camera 110's field-of-view. The camera module 112 automatically segments the camera 110's field-of-view, based on the depth map, into a plurality of segments.

The camera module 112 refines the depth map to change the fidelity of the depth map. Using a higher-fidelity depth map can decrease the performance of the camera module 112. A higher-fidelity depth map may take more processing time and computing resources generating all-in-focus images, than if a lower-fidelity depth map is used.

The camera module 112 reduces the fidelity of the depth map, normalizing the depths indicated by the depth map to fewer discrete focal distances than in the original depth map. Each focal distance from a set of focal distances corresponds to a different segment. Or in other words, the camera module 112 segments the depth map into a discrete quantity of focal distances that approximate the distance separating the camera 110 and a segment (e.g., an object-of-interest visible at a corresponding position within the camera's field-of-view). If a depth map includes a range of depths between zero and one hundred feet, the camera module 112 can normalize the depth map to only indicate depths of either: less than five feet, less than fifty feet, or greater than or equal to fifty feet. Rather than depths that range from zero to one hundred feet, the depth map is refined to be of a fidelity sufficient for indicating only one of the three discrete intervals.

The camera module 112 can use a computer-model, such as a machine-learned model (e.g., a neural network) or another type of model, and automatically segment a depth map into a discrete set of focal distances. The camera module 112 may input sensor data from the sensors 104, or a depth map derived by the sensor data, into a model of the camera module 112. The model is trained or programmed to output a refined depth map where focal distances associated with nearby positions in the field-of-view are normalized, averaged, or otherwise smoothed. The refined depth map indicates a discrete set of focal distances, with each corresponding to a different segment in the field-of-view. The camera module 112 segments the depth map into a first segment, a second segment, and so forth, according to the different focal distances. A plurality of segments can be inferred from the sensor data in this way, and each segment defines, or is associated with, a unique focus area within the field-of-view. The first segment includes focal distances of a first approximate value, positions in the second segment have focal distances of a second approximate value different than the first approximate value, and so forth. In the end, the camera module 112 maintains a set of focal distances with each in the set corresponding to a different area or object-of-interest in the scene 118. In the example of FIG. 1, the set of focal distances includes a respective focal distance for each segment of the depth map, including a respective focal distance for the mountain range, the sun, the airplane, and each of the two people at the different distances from the user equipment 102.

To generate an all-in-focus image, the camera module 112 directs the camera 110 to capture an image at each of the different focal distances derived from the sensor data and depth map. The camera module 112 sweeps an autofocus lens of the camera 110 through some or all of the maintained focal distances and captures a sample image at each of the focal distances swept by the autofocus lens. The camera module 112 directs the camera 110 to focus on each of the different focal distances indicated by the inferred segments of the depth map, stopping at each long enough for the camera 110 to capture a sample image from that focal point.

The camera module 112 produces an all-in-focus image by combining at least part of the sample image captured at each of the focal distances swept by the autofocus lens. The camera module 112 outputs for display an indication of the all-in-focus image produced from combining the images sampled at each of the different focal distances. For example, the camera module 112 can layer the sample images captured at each of the different focal distances on top of each other. By adjusting transparency or opacity (e.g., via an alpha-channel adjustment to the sample images) the camera module 112 may cause areas or objects-of-interest at each of the different focal distances to appear as sharp as the areas or objects-of-interest at each of the other focal distances.

Applying defocus to the all-in-focus image can further improve the aesthetic appearance of the image through artificial deblurring and focus blending. The camera module 112 may output the all-in-focus image within the user interface 116, e.g., as a recommended image, as an image within a gallery or edit page, as a captured image taken in response to detecting a capture command, or in other manners.

In this way, user equipment, like the user equipment 102, can automatically generate all-in-focus images with a mobile camera. Using depth information indicative of a mobile camera's field-of-view, different autofocus lens positions of the mobile camera can be determined and quickly swept to generate images focused at each of the different lens positions. By combining in-focus portions of each of the sampled images into a single image, the user equipment forms an all-in-focus image of the mobile camera's field-of-view. Mobile camera imaging may therefore be improved.

Figure 2:
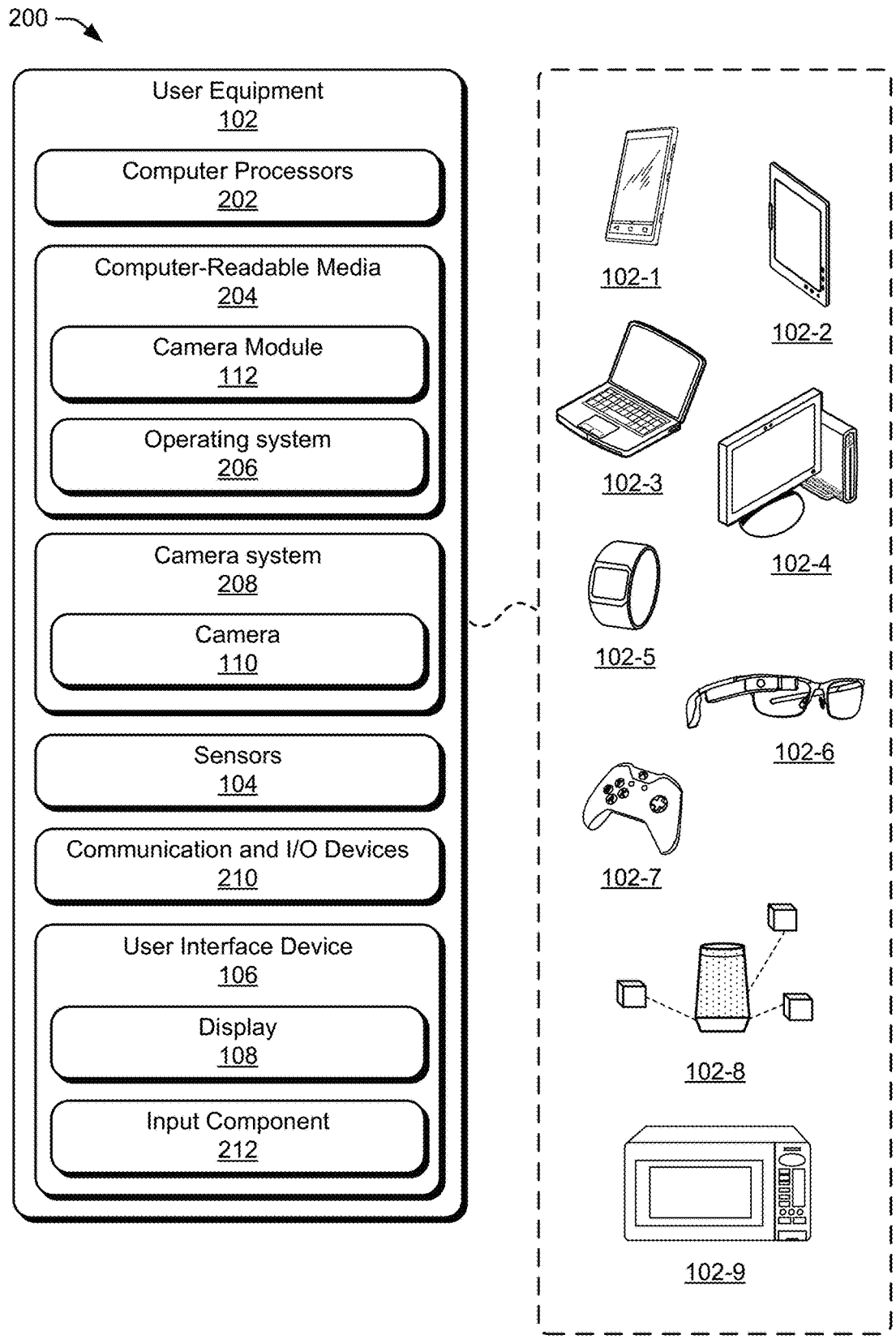
FIG. 2 illustrates an example of the user equipment set forth in FIG. 1.

FIG. 2 illustrates an example 200 of the user equipment 102 set forth in FIG. 1. The user equipment 102 of FIG. 2 is illustrated with a variety of example devices, including a smartphone 102-1, a tablet 102-2, a laptop 102-3, a desktop computer 102-4, a computing watch 102-5, computing eyeglasses 102-6, a gaming system or controller 102-7, a smart speaker system 102-8, and an appliance 102-9. The user equipment 102 can also include other devices, such as televisions, entertainment systems, audio systems, automobiles, drones, trackpads, drawing pads, netbooks, e-readers, home security systems, and other devices with a camera and need for taking all-in-focus images.

The user device 102 includes one or more computer processors 202, one or more computer-readable media 204 including the camera module 112 and an operating system 206 stored within, a camera system 208 including the camera 110, the sensors 104, one or more communication and input/output (I/O) devices 210, and the user interface device 106, including the display 108 and an input component 212.

The one or more computer processors 202 and the one or more computer-readable media 204, which includes memory media and storage media, are the main processing complex of the user equipment 102. The camera module 112, the operating system 206, and other applications (not shown) can be implemented as computer-readable instructions on the computer-readable media 204 which can be executed by the computer processors 202 to provide some or all of the functionalities described herein, such as some or all of the functions of camera module 112 (shown within the computer-readable media 204, though this is not required).

The one or more processors 202 may include any combination of one or more controllers, microcontrollers, processors, microprocessors, hardware processors, hardware processing units, digital-signal-processors, graphics processors, graphics processing units, and the like. The processors 202 may be an integrated processor and memory subsystem (e.g., implemented as a "system-on-chip"), which processes computer-executable instructions to control operations of the user equipment 102.

The computer-readable media 204 is configured as persistent and non-persistent storage of executable instructions (e.g., firmware, recovery firmware, software, applications, modules, programs, functions, and the like) and data (e.g., user data, operational data) to support execution of the executable instructions. Examples of the computer-readable media 204 include volatile memory and non-volatile memory, fixed and removable media devices, and any suitable memory device or electronic data storage that maintains executable instructions and supporting data. The computer-readable media 204 can include various implementations of random-access memory (RAM), read-only memory (ROM), flash memory, and other types of storage memory in various memory device configurations. The computer-readable media 204 excludes propagating signals. The computer-readable media 204 may be a solid-state drive (SSD) or a hard disk drive (HDD).

The operating system 206 may be separate from the camera module 112. The operating system 206 may include the camera module 112. The operating system 206 generally controls functionality of the user equipment 102, including the user interface device 106 and other peripherals such as the communication and I/O device 210. The operating system 206 provides an execution environment for applications, may control task scheduling, and other general functionality, and generally does so through a system-level user interface. The user interface device 106 manages input and output to the operating system 206 and other applications and services executing at the user equipment 102, including the camera module 112.

The user interface device 106 includes an input component 212. For receiving input, the user interface device 106 may include a presence-sensitive input component operatively coupled to (or integrated within) the display 108. The input component 212 can include other types of input or output components, including a microphone, a speaker, a mouse, a keyboard, a fingerprint sensor, a camera, a radar, or another type of component configured to receive input from a user. The user interface device 106 may be configured to detect various forms of user input, including two-dimensional gesture inputs, three-dimensional gesture inputs, audible inputs, sensor inputs, visual inputs, and other forms of input. The input component 212 can include an optical, an infrared, a pressure-sensitive, a presence-sensitive, or a radar-based gesture detection system.

When configured as a presence-sensitive input component, a user of the user equipment 102 can provide two-dimensional or three-dimensional gestures at or near the display 108 as the display 108 presents the camera interface 116. In response to the gestures, the user interface device 106 may output information to other components of the user equipment 102 to indicate relative locations (e.g., X, Y, Z coordinates) of the gestures, and to enable the other components to interpret the gestures for controlling the camera interface 116 or other interface being presented on the display 108. The user interface device 106 may output data based on the information generated by the display 108 which, for example, the camera module 112 may use to control the camera 110.

The communication and I/O devices 210 provide additional connectivity, beyond just the user interface device 106, to the user equipment 102 and other devices and peripherals. The communication and I/O devices 210 include data network interfaces that provide connection and/or communication links between the device and other data networks (e.g., a mesh network, external network, etc.), devices, or remote computing systems (e.g., servers). As I/O devices, the communication and I/O devices 210 can be used to couple the user equipment 102 to a variety of different types of components, peripherals, or accessory devices. The communication and I/O devices 210 can also include data input ports for receiving data, including image data, user inputs, communication data, audio data, video data, and the like. As communication devices, the communication and I/O devices 210 enable wired or wireless communicating of device data between the user equipment 102 and other devices, computing systems, and networks. The communication and I/O devices 210 can include transceivers for cellular phone communication or for other types of network data communication.

The camera system 208 includes the camera 110 and other camera-related components. The camera system 208 may include multiple cameras, including the camera 110, for different purposes. For example, the camera system 208 can include infrared camera technology for low-light imaging and an optical camera for bright-light conditions. The camera system 208 can include the camera 110 facing in a first direction and one or more other cameras facing in other directions to provide a greater total field-of-view. The multiple cameras may have different fields-of-view.

Figure 3:
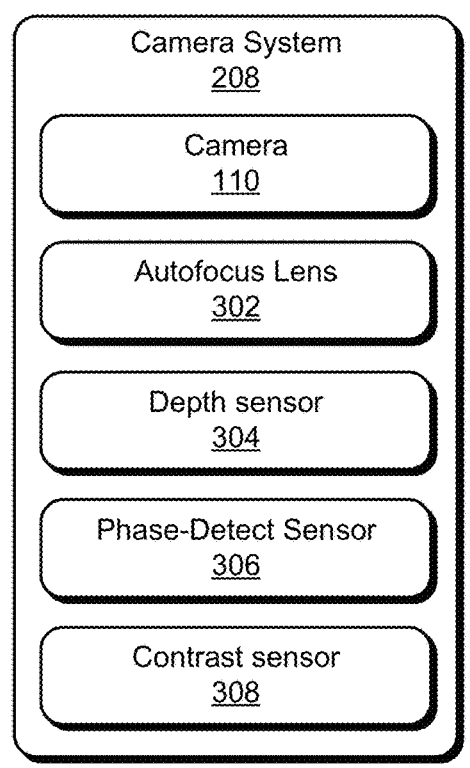
FIG. 3 illustrates an example of the camera system set forth in FIG. 2.

FIG. 3 illustrates an example 300 of the camera system 208 set forth in FIG. 2. The camera system 208 includes the camera 110, an autofocus lens 302, a depth sensor 304, a phase-detection sensor 306, and a contrast sensor 308. The camera system 208 may be communicatively coupled to the sensors 104 for obtaining sensor data to perform the described techniques. The camera system 208 may include one or more lenses, controllers, or other components beyond just the camera 110. The camera system 208, in response to commands from the camera module 112, sweeps the autofocus lens 302 to different focal distances. The autofocus lens 302 sweeps to the different focal distances to capture sample images with the camera 110 of each of the different segments that the camera module 112 identified, from a depth map produced from sensor data generated by any of the sensors 104, 304, 306, or 308. The autofocus lens 302 may be a VCM lens or a MEMS magnetic actuator lens.

Figure 4:
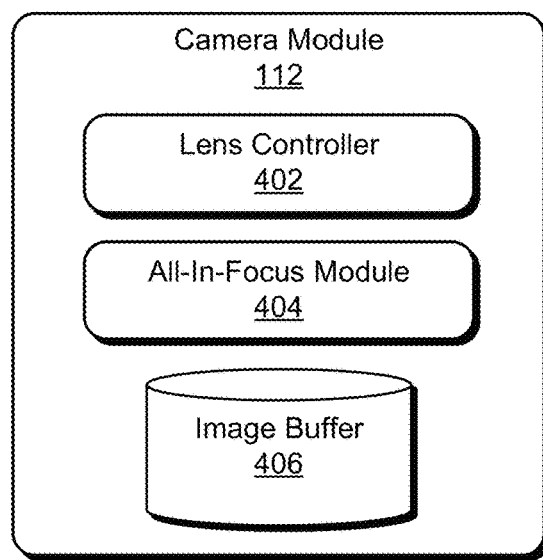
FIG. 4 illustrates an example of the camera module set forth in FIGS. 1 and 2.

FIG. 4 illustrates an example 400 of the camera module 112 set forth in FIGS. 1 and 2. The camera module 112 includes a lens controller 402, an all-in-focus module 404, and an image buffer 406.

The lens controller 402 controls the autofocus lens 302 set forth in FIG. 3. For example, when sweeping the different focal distances to create an all-in-focus image, the lens controller 402 drives the autofocus lens to the different focal distances, by issuing commands or signals to the camera system 208. The lens controller 402 controls the camera system 208 in response to signals or commands received from the all-in-focus module 404.

The image buffer 406 may be a circular buffer. The image buffer 406 stores previously-captured images during a burst capture sequence, for example, to reduce shutter-lag. Shutter-lag is generally the time it takes for a camera to record an image since triggering the camera's shutter (e.g., pressing a capture button). Ideally, the camera 110 has "Zero-Shutter-Lag" to enable the camera 110 to capture images at the precise moment commanded by the camera module 112.

The camera module 112 monitors user interactions with the user interface 116. The camera module 112 operates in one state or another depending on user inputs detected by the user interface device 106 when the user interface 116 is displayed. When the camera module 112 determines that a capture command in response to user input is imminent (e.g., a next state of the camera module 112 includes a capture sequence), the camera module 112 can place the camera 110 into zero-shutter-lag mode. The camera module 112 directs the camera system 208 to buffer images of the camera 110's field-of-view at the image buffer 406. The camera module 112 determines a time of the user input and outputs the previous image recorded in the image buffer 406 at the same or nearly the same time the user input was detected. For example, when a viewfinder is visible in the user interface 116, the camera module 112 operates the camera 110 in burst-mode, buffering a rapid-fire sequence of images of the field-of-view. The camera module 112 initiates burst-mode and the rapid-fire capturing and buffering of previous images within the image buffer 406 just before detecting a user input or otherwise predicting that a capture command is imminent. The camera module 112 may execute a state machine, and when a next state of the state machine can be a state during which a capture command is issued, the camera module 112 automatically places the camera in burst-mode and stores images at the image buffer 406.

Benefits of maintaining the image buffer 406 to promote zero-shutter-lag are apparent and include an increased chance of success in capturing a particular image of a scene. However further previously-unrealized benefits of the image buffer 406 and the previously captured images stored therein include producing all-in-focus images more-quickly and more-efficiently. As part of ongoing zero-shutter-lag buffering, the camera module 112 buffers previous images captured of the field-of-view of the camera 110 prior to the all-in-focus module 404 directing the lens controller 402 in sweeping the autofocus lens 302.

The all-in-focus module 404 configures the camera module 112 for generating all-in-focus pictures. When determining a set of focal distances for sweeping the autofocus lens 302, the all-in-focus module 404 determines whether any images in the image buffer 406 already provide an image taken when the autofocus lens 302 was at any of the focal distances in the set. For example, the all-in-focus module 404 determines from metadata of previous images stored in the image buffer 406 that a previous image was recorded when the autofocus lens 302 was on a focal distance associated with the segment of the airplane. Rather than drive the autofocus lens 302 to the focal distance of the airplane again to take another picture for creating an all-in-focus image, the all-in-focus module 404 reuses the image in the image buffer 406. The all-in-focus module 404 refrains from sweeping the autofocus lens 302 to a particular focal distance from the set of focal distances that the autofocus lens 302 was at when capturing the previous image of the airplane. The all-in-focus module 404 may refrain from sweeping to multiple focal distances if multiple reusable images are contained within the image buffer 406. All-in-focus images may therefore be generated quicker and more efficiently.

Figure 5:
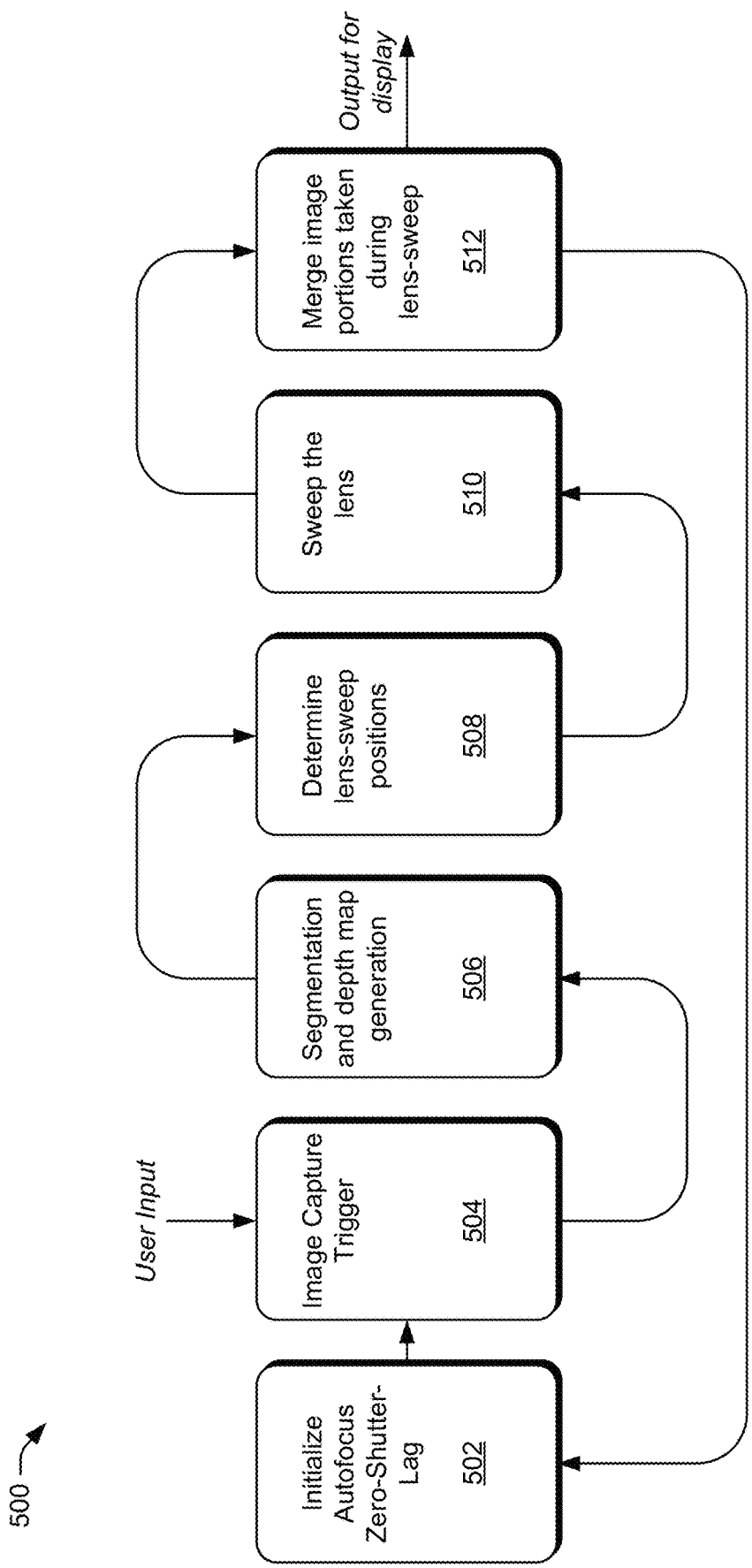
FIG. 5 illustrates an example processing sequence of the all-in-focus module set forth in FIG. 4.

FIG. 5 illustrates an example processing sequence 500 of the all-in-focus module 404 set forth in FIG. 4. The processing sequence 500 includes steps 502 through 512 in one possible order and many other orders exist.

The camera module 112 initialized an autofocus zero-shutter-lag feature at step 502 before user input is received by the user equipment 102. In response to the user input, and after initializing the zero-shutter-lag feature, the camera module 112 triggers an image capture at step 504. At step 506, the camera module 112 receives sensor data from the sensors 104 and determines a depth map of the camera 110's field-of-view to determine a set of focal distances for generating an all-in-focus image. At step 508 the camera module 112 refines the set of focal distances by omitting any focal distances associated with images stored in the image buffer 406 since step 502 (images captured by the camera prior to sweeping the autofocus lens).

At 510 the all-in-focus module 404 sweeps the autofocus lens 320; it drives the autofocus lens 302 to each of the focal distances (optionally refraining from driving the autofocus lens of the camera to a focal distance associated with images stored in the image buffer 406) and captures a sample image to later be used in generating an all-in-focus image. The all-in-focus module 404 drives the autofocus lens 302 to each focal distance, for a sufficient time to capture the sample image at the first focal distance. For example, prior to driving the autofocus lens 302 to a second focal distance the all-in-focus module 404 drives the autofocus lens 302 to a first focal distance for a sufficient time to capture the sample image at the first focal distance.

Sometimes, the autofocus lens 302 is already near a focal distance that needs sweeping. The all-in-focus module 404 determines a current focal distance of the autofocus lens 302. Responsive to determining that the current focal distance is at or near (e.g., within a threshold of) a focal distance needing to be swept, the all-in-focus module 404 begins sweeping the autofocus lens 302 at the current focal distance. Initiating a sweep of the autofocus lens by beginning with a focal distance that is nearest a current focal distance may be a most efficient way to sweep all the focal distances.

The all-in-focus module 404 determines an order for sweeping the autofocus lens 302 at step 510. The order may start with a focal distance nearest a current position of the autofocus lens 302. In other examples, the order of the focal distances may depend on other characteristics of the camera system 208. The all-in-focus module 404 determines an order to minimize time the autofocus lens 302 is sweeping, such as nearest-focal distance to farthest-focal distance, or in some other efficient order to minimize time spent moving the autofocus lens to different focus-positions. An all-in-focus image may therefore be provided in a quicker and more efficient manner.

At 512 the all-in-focus module 404 merges or combines image portions taken during the lens-sweep at 510. The all-in-focus module 404 merges or combines focused portions of each sample image captured at the different focal distances by layering the sample images and varying transparency and opacity to mask unfocused portions of sample images with focused portions of other sample images.

FIGS. 6-1 through 6-9 illustrate example screen-shots 600-1 and 600-9 and image samples 600-2, 600-3, 600-4, 600-5, 600-6, and 600-7 captured when automatically producing an all-in-focus image 600-8 with a mobile camera.

Figures 1, 6:
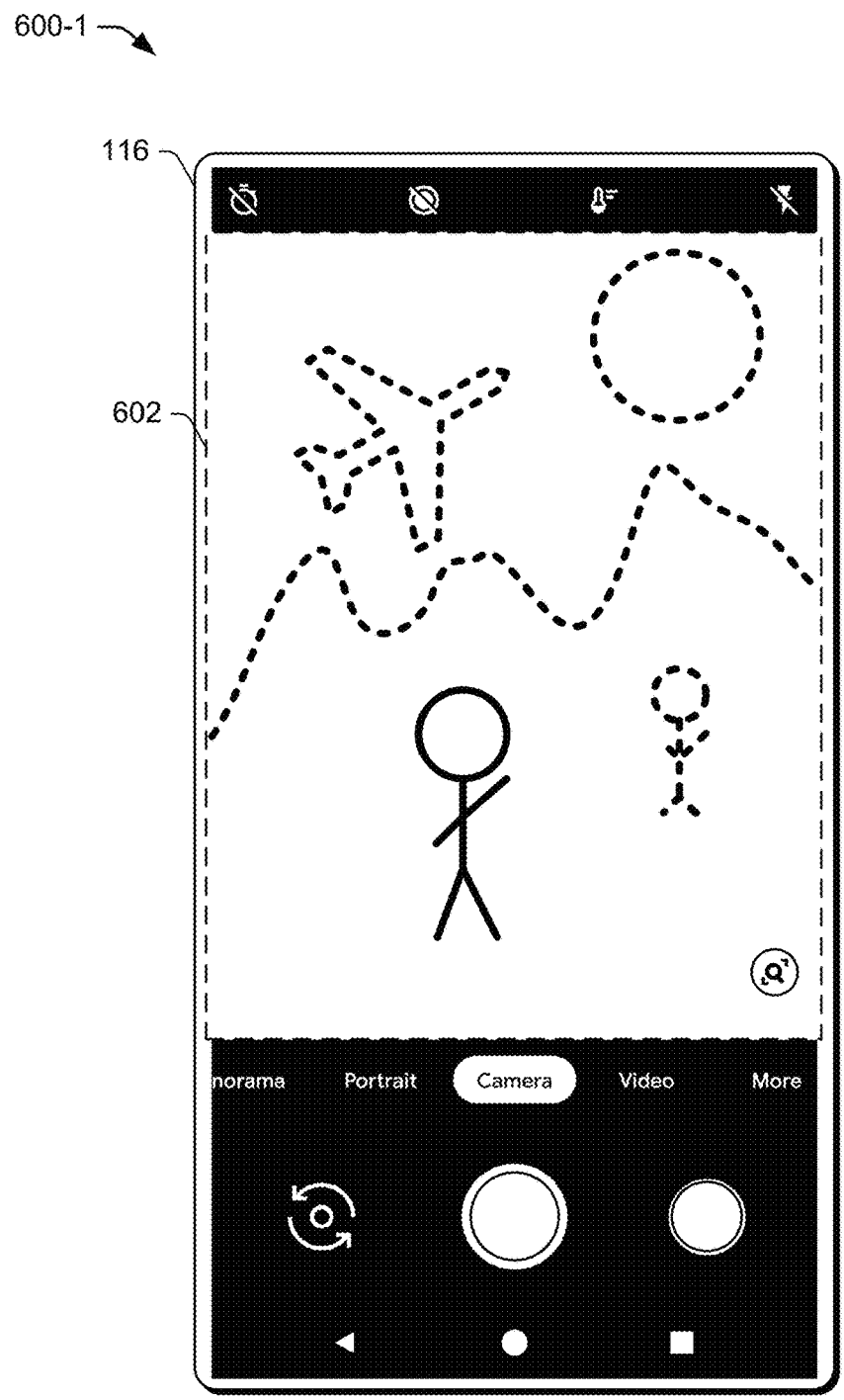
Figures 2, 6:
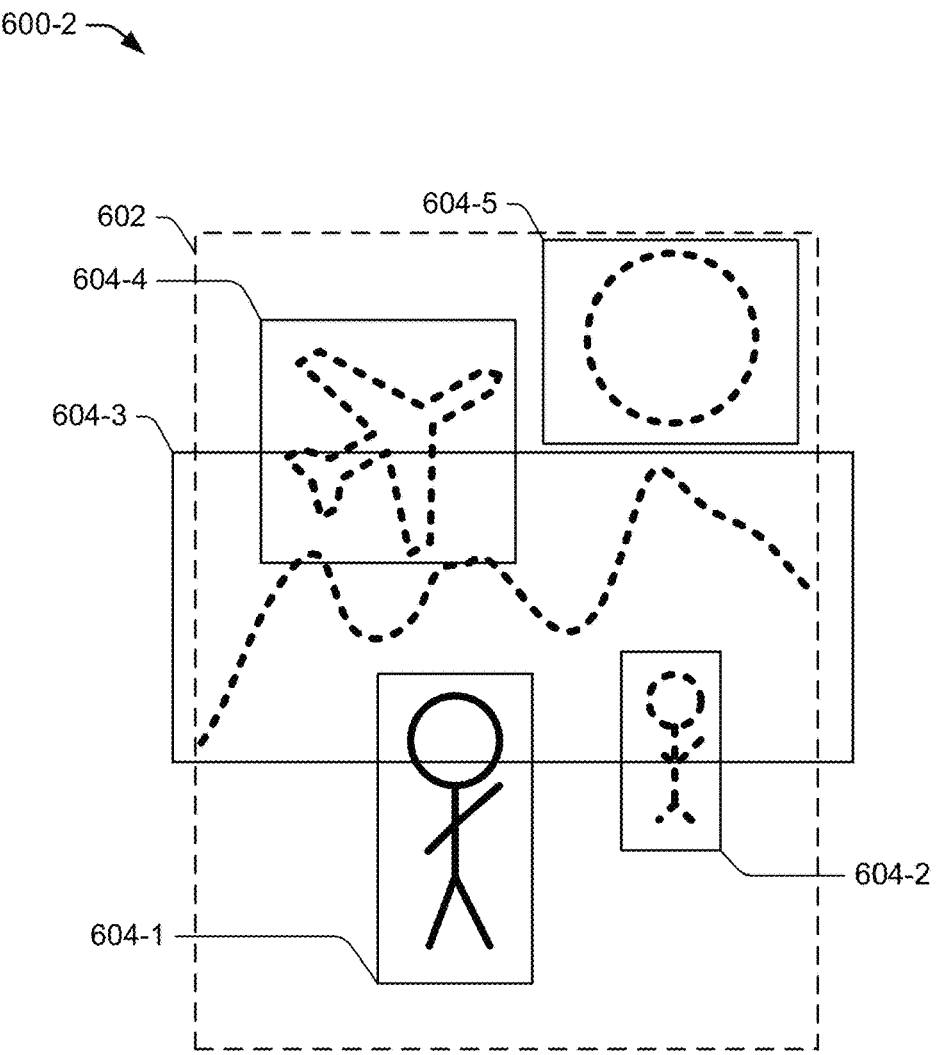
Figures 3, 6:
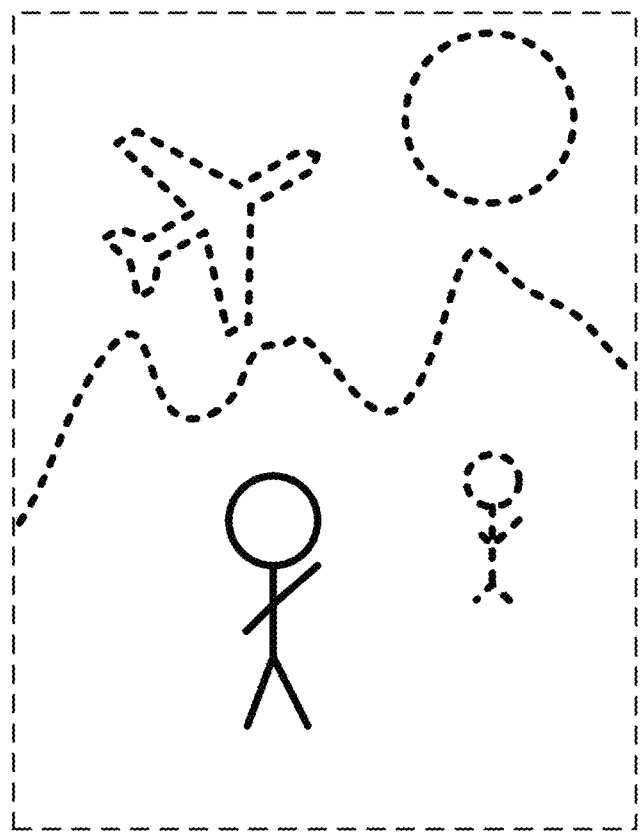
Figures 4, 6:
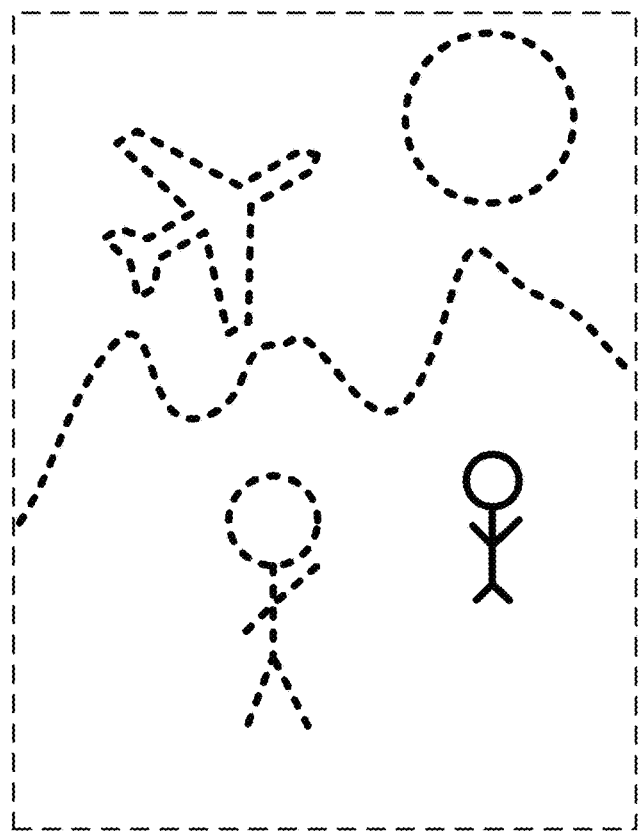
Figures 5, 6:
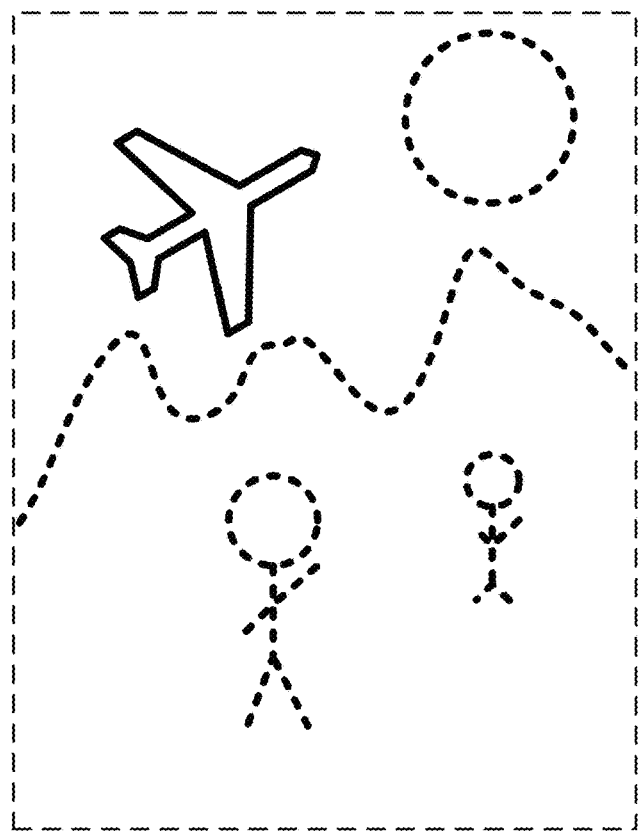
Figure 6:
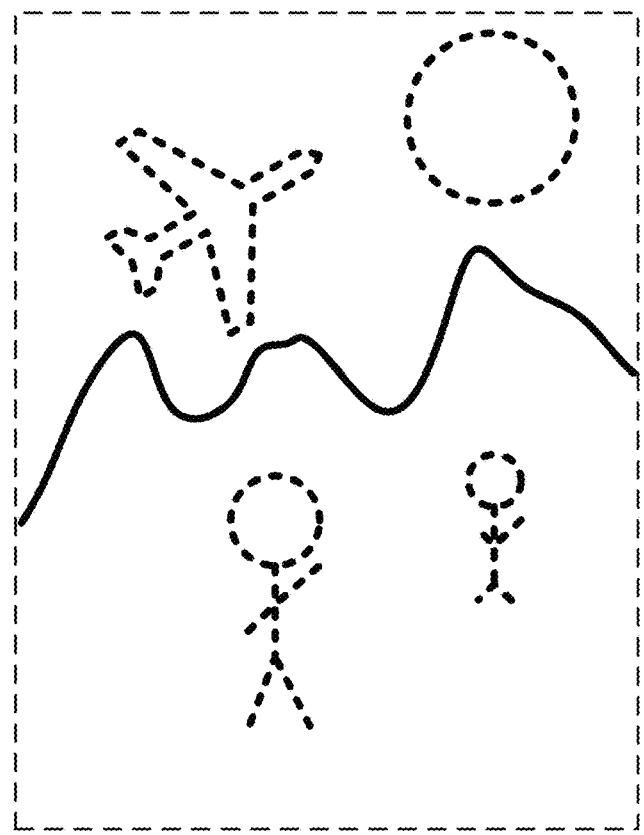

FIG. 6-1 shows the scene 118 within a field-of-view 602 of the camera 110. The field-of-view 602 is displayed within the user interface 116. At the current focal distance, the autofocus lens 302 focuses the camera 110 on one person in the scene 118 (as shown by solid lines). At the current focal distance, the autofocus lens 302 is out-of-focus of the rest of the scene 118 (as shown by dashed lines).

FIG. 6-2 illustrates the field-of-view 602 divided into a plurality of segments by the all-in-focus module 404. The camera module 112 obtains sensor information and determines a depth map of the field-of-view 602. The all-in-focus module 404 refines the depth map to determine a discrete set of focal distances to objects in the scene 118. Each object or focal-area that is of sufficient size is treated as a segment 604-1 through 604-5 defining a unique focus area. For example, the segment 604-1 is of the in-focus person at the current focal distance and the segment 604-2 is of the other person in the scene 118 that is slightly out-of-focus at the current focal distance. Segments 604-3, 604-4, and 604-5 correspond respectively to the mountain range, the airplane, and the sun in the scene 118.

Figures 6, 7:
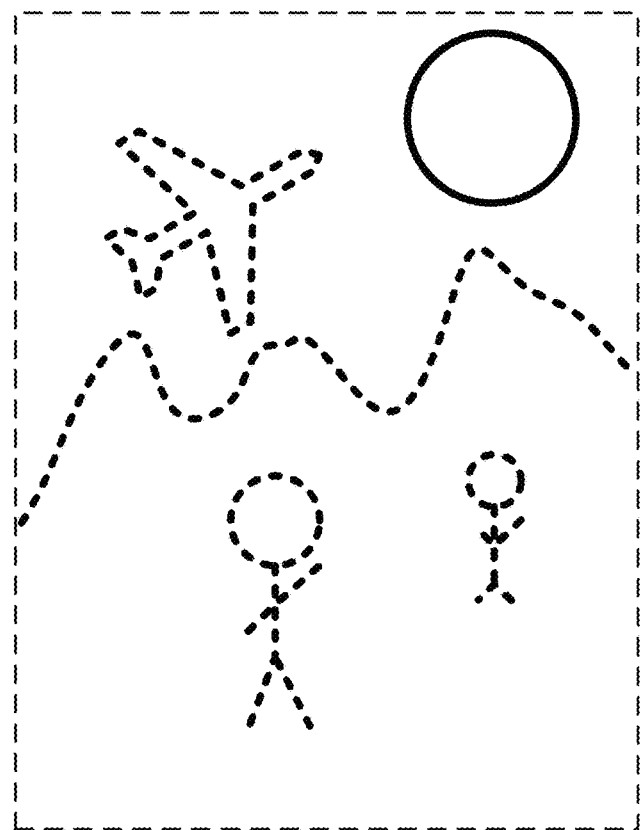

In FIG. 6-3, in determining an order for focusing in on each of the segments 604-1 through 604-5, the all-in-focus module 404 determines that the segment 604-1 is already captured by a previous image stored in the buffer 406. Hence, the all-in-focus module 404 refrains from driving or navigating to autofocus lens position A and uses the buffered image for the segment 604-1. In FIGS. 6-4 through 6-7, the all-in-focus module 404 drives or navigates sequentially to each of the focal distances associated with the segments 604-2 through 604-5 until all the other image samples 600-3, 600-4, 600-5, 600-6, and 600-7 are captured.

Figures 6, 7, 8:
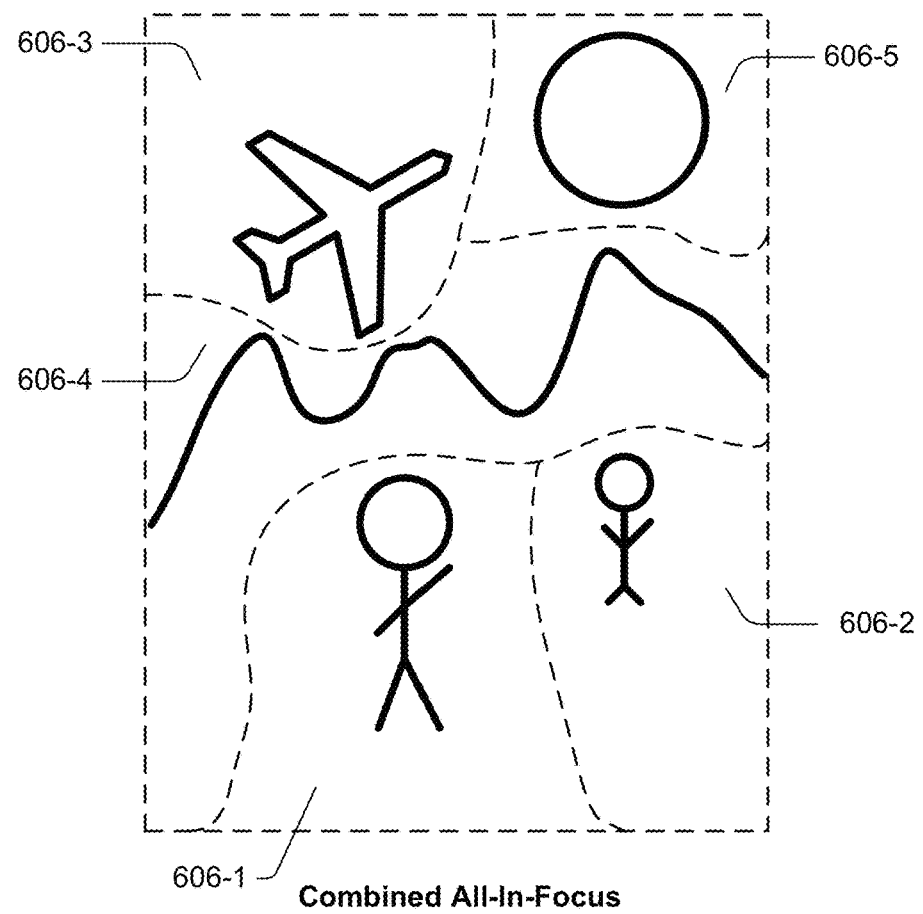
Figures 6, 7, 8, 9:
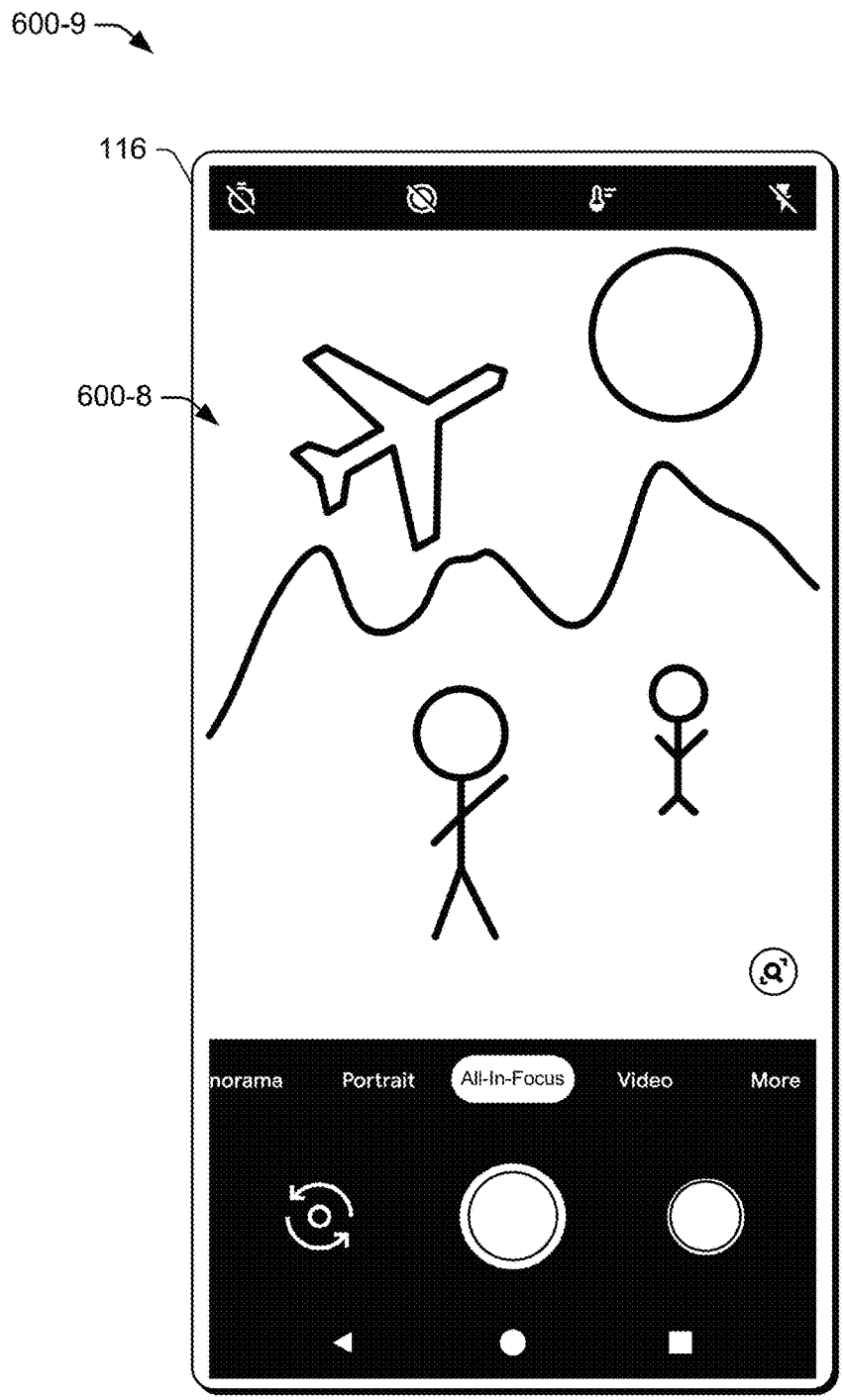
Figure 7:
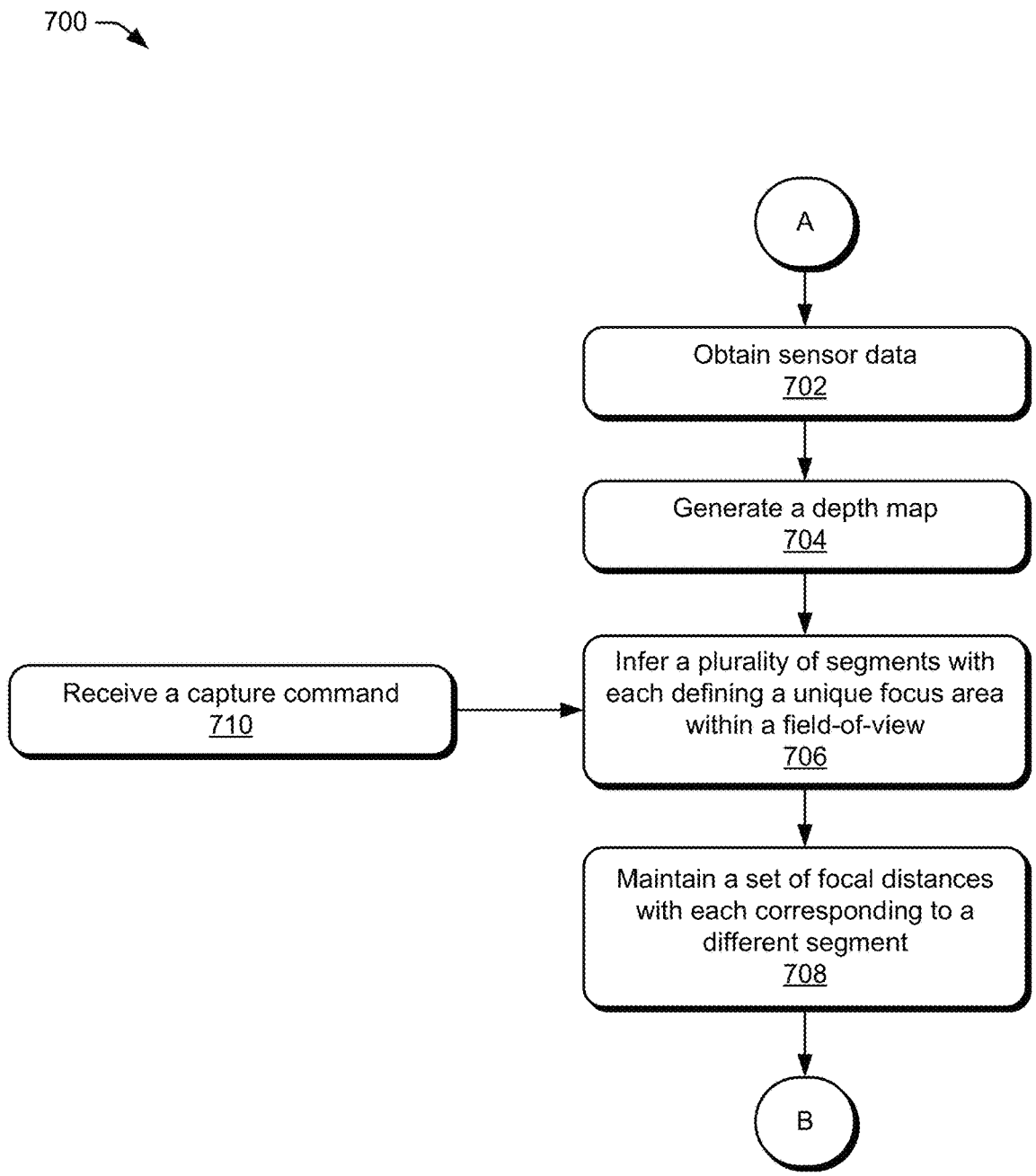
Figure 8:
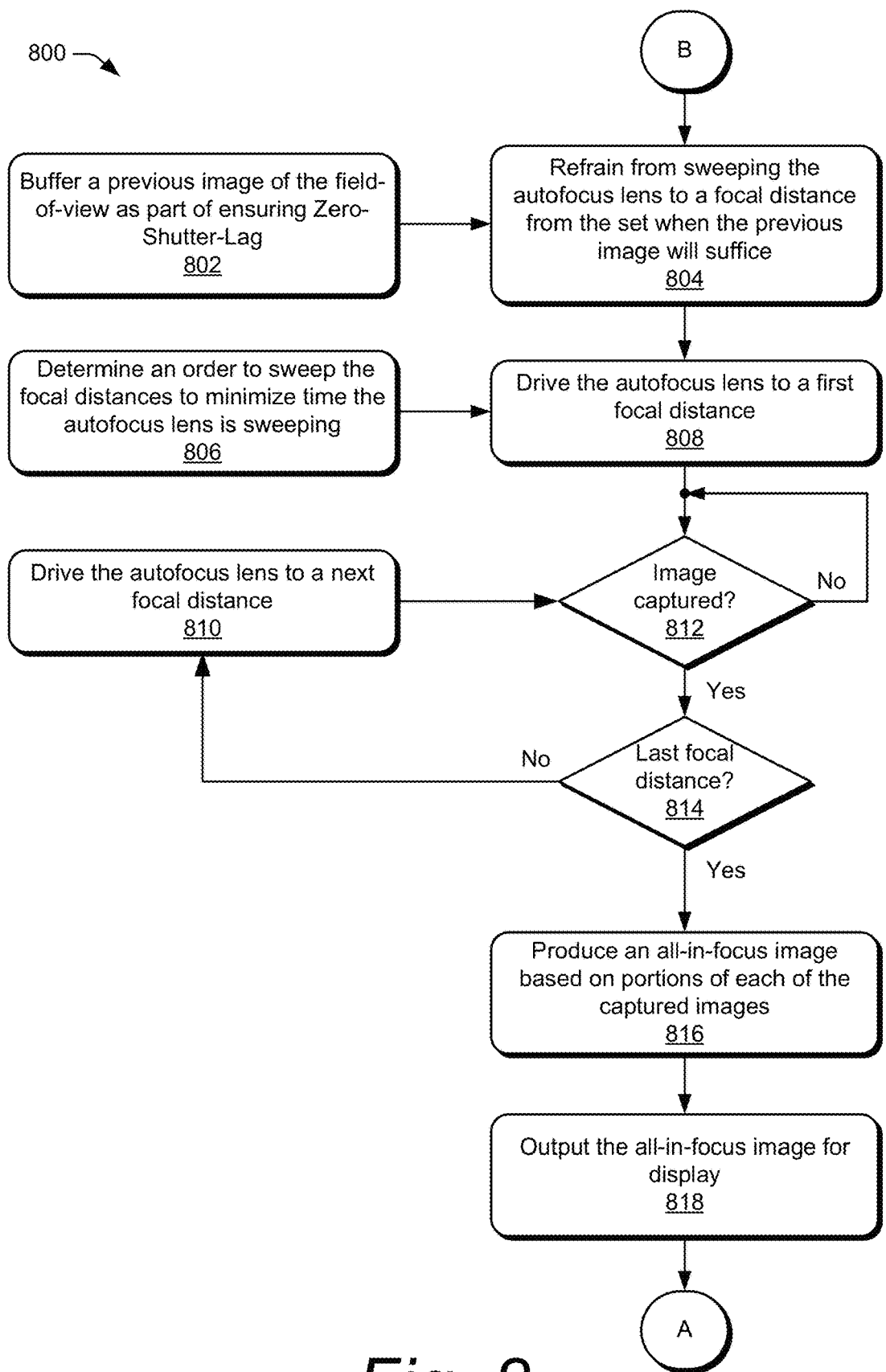

In FIG. 6-8 the image samples 600-3, 600-4, 600-5, 600-6, and 600-7 which define segments 604-1 through 604-5 and which are made up of individual portions 606-1 through 606-5, are layered, merged, pieced together, or otherwise combined to form the all-in-focus image 600-8. For example, each portion 606-1 through 606-5 may be extracted (e.g., cut) from one of the image samples 600-3, 600-4, 600-5, 600-6, and 600-7. The all-in-focus image 600-8 may be formed by piecing-together the portion 606-1 through 606-5 cut from the image samples 600-3, 600-4, 600-5, 600-6, and 600-7. The boundaries around the extracted portions 606-1 through 606-5 are brought together to form the all-in-focus image 600-8 shown in user interface 116. Each portion 606-1 through 606-5 is associated with a particular area relative to x,y coordinate locations of the all-in-focus image 600-8. Colors at the coordinate locations of the all-in-focus image 600-8 are attributed to colors of corresponding pixels from one of the portions 606-1 through 606-5. Portions 606-1 through 606-5 are arranged adjacent to one another to produce the all-in-focus image. In FIG. 6-9, the all-in-focus image 600-8 is output for display within the user interface 116.

The camera module 112 and the all-in-focus module 404 can automatically enter in and out of all-in-focus mode automatically. In other cases, all-in-focus mode can be entered in response to a user input. The user equipment 102 can output an indication of "all-in-focus" mode within the user interface 116, for example, as shown in FIG. 6-9 near the center of the user interface 116 where the "capture" button now displays an "all-in-focus" button.

The camera module 112 can enter all-in-focus mode automatically in response to the depth map determined from the depth information or other sensor data obtained from the sensors 104. For example, in generating, based on the sensor data, a depth map indicative of the plurality of segments 604-1 through 604-5, the all-in-focus module 404 may automatically determine that the depth map includes two or more segments from the plurality of segments 604-1 through 604-5 with respective focal distances that are at least a threshold distance apart. Said differently, identifying segments that vary in focal distance by at least a threshold amount can trigger the all-in-focus module 404 to generate an all-in-focus image, automatically rather than based on user input to enter all-in-focus mode. The all-in-focus module 404 causes the camera module 112 to automatically operate the camera 110 in the all-in-focus mode in response to determining that the depth map includes the two or more segments with the respective focal distances that are at least the threshold distance apart.

FIGS. 7 and 8 illustrate example methods 700 and 800 for automatic generation of all-in-focus images with a mobile camera. The method 700 begins at "A" and ends at "B" and the method 800 begins at "B" and ends at "A". The methods 700 and 800 can include additional or fewer steps than that shown in FIGS. 7 and 8, and may be performed in a different order. The methods 700 and 800 are described below in the context of user equipment 102. It should be understood however that some, or all, of the methods 700 and 800 may performed by or with the assistance of a remote computing system, such as a cloud server or a workstation communicating with the user equipment 102 via a computer network.

At 702, the user equipment 102 obtains sensor data. For example, the sensors 104 generate sensor data (e.g., radar returns, infrared dot scans) as the user equipment 102 is held by the user 114 to take a picture of the scene 118.

At 704, the user equipment 102 generates a depth map. For example, the user equipment 102 uses the sensor data obtained at 702 to create an abstraction of focal distances to objects within the field-of-view of the camera 110.

At 706, responsive to receiving a capture command at 710, the user equipment 102 infers from the sensor data a plurality of segments, with each defining a unique focus area within a field-of-view. The depth map can be refined to isolate a quantity of focus areas—or areas-of-interest within the field-of-view. In particular, a focus area is a portion of a field-of-view with a grouping of focal distances that are within a threshold range of distances. When normalized, the grouping of focal distances converge to a uniform focal distance, each of the uniform focal distances making a segment.

At 708, the user equipment 102 maintains a set of focal distances with each corresponding to a different segment. The method 700 then transitions at "B" to the method 800.

At 802, the user equipment 102 operates in a zero-shutter-lag mode. In anticipation of receiving the capture command at 710, the user equipment 102 buffers images of the field-of-view at the image buffer 406.

At 804, the user equipment 102 refrains from sweeping the autofocus lens to a focal distance from the set when the previous image will suffice. In other words, when an image buffered at 802 is taken at the focal distance needed for a particular segment, the user equipment 102 can use the previous image to build the all-in-focus image, rather than controlling the autofocus lens to the focal distance to take a new image of the segment.

At 806, the user equipment 102 determines an order to sweep the focal distances to minimize time the autofocus lens is sweeping and at 808, drives the autofocus lens to a first focal distance. For example, the user equipment 102 may omit any focal distances identified in step 804, and start with driving the autofocus lens 302 to the furthest focal distance from the camera 110 contained in the set.

At 812, no, the user equipment 102 stays at the focal distance until an image can be captured. When a sample image is captured, the user equipment determines whether that was the last focal distance at 814. If the user equipment 102 has not reached the last focal distance, the user equipment 102 at 814, no, drives the autofocus lens 302 to a next focal distance in the order determined at 806, repeating 812 until an image is taken at the last focal distance.

If the user equipment 102 reaches the last focal distance, the user equipment 102 at 814, yes, goes on to step 816 where the user equipment 102 produces an all-in-focus image based on portions of each of the captured images from above. At 818, the user equipment 102 outputs the all-infocus image for display and returns to "A" where the methods 700 and 800 can repeat.

The following are further examples of the techniques and systems described in the foregoing description and shown in the drawings.

Example 1. A method for producing an all-in-focus image with a camera of a user equipment, the method comprising: inferring, based on sensor data, a plurality of segments each defining a unique focus area within a field-of-view of the camera; maintaining a set of focal distances corresponding to different segments from the plurality of segments; sweeping an autofocus lens of the camera to one or more of the focal distances from the set of focal distances; capturing sample images, each of the sample images captured at each of the one or more of the focal distances from the set of focal distances swept by the autofocus lens; combining at least one of the sample images captured at the one or more focal distances swept by the autofocus lens with another image to produce the all-in-focus image; and outputting, for display, an indication of the all-in-focus image.

Example 2. The method of example 1, wherein the other image is an image of the field-of-view captured by the camera prior to sweeping the autofocus lens, and sweeping the autofocus lens of the camera to one or more of the focal distances from the set of focal distances comprises refraining from sweeping the autofocus lens of the camera to a particular focal distance from the set of focal distances at which the autofocus lens captured the other image.

Example 3. The method of example 1, wherein the other image comprises a second image from the sample images, the second image being different than the at least one of the sample images being combined to produce the all-in-focus image.

Example 4. The method of any of examples 1-3, further comprising: obtaining, from a depth sensor, a contrast sensor, or a phase-detection-sensor, the sensor data.

Example 5. The method of any of examples 1-4, wherein the autofocus lens comprises a voice coil motor lens.

Example 6. The method of any of example 1-5, wherein combining the at least one of the sample images captured at the one or more focal distances swept by the autofocus lens with the other image to produce the all-in-focus image comprises: layering the at least one of the sample images captured at the one or more focal distances swept by the autofocus lens with the other image; and adjusting an alpha-channel of each of the sample images to control transparency or opacity and sharpen areas or objects-of-interest at each of the set of focal distances.

Example 7. The method of any of examples 1-5, wherein combining the at least one of the sample images captured at the one or more focal distances swept by the autofocus lens with the other image to produce the all-in-focus image comprises: extracting a portion of the at least one of the sample images captured at the one or more focal distances swept by the autofocus lens; extracting a portion of the other image; and arranging the portion of the at least one of the sample images captured at the one or more focal distances swept by the autofocus lens adjacent to the portion of the other image in producing the all-in-focus image.

Example 8. The method of any of examples 1 to 7, further comprising: automatically operating the camera in the all-in-focus mode based on the sensor data.

Example 9. The method of example 8, wherein automatically operating the camera in the all-in-focus mode comprises: generating, based on the sensor data, a depth map indicative of the plurality of segments; determining that the depth map includes two or more segments from the plurality of segments with respective focal distances that are at least a threshold distance apart; and automatically operating the camera in the all-in-focus mode in response to determining that the depth map includes the two or more segments with the respective focal distances that are at least the threshold distance apart.

Example 10. The method of any of examples 1-9, wherein inferring the plurality of segments comprises obtaining a depth map indicative of the plurality of segments, the depth map obtained from the sensor data. For example, example 1 may optionally comprise obtaining, from sensor data, a depth map indicative of a plurality of segments, each segment defining a unique focus area within a field of view of the camera.

Example 11. The method of any of examples 1-10, wherein sweeping the autofocus lens of the camera to the one or more of the focal distances from the set of focal distances comprises: prior to driving the autofocus lens to a second focal distance of the one or more of the focal distances, driving the autofocus lens to a first focal distance of the one or more of the focal distances for a sufficient time to capture the sample image at the first focal distance.

Example 12. The method of example 11, wherein the first focal distance is nearest a current focal distance of the autofocus lens prior to sweeping the autofocus lens of the camera.

Example 13. The method of any of examples 1-12, wherein sweeping the autofocus lens of the camera to the one or more of the focal distances from the set of focal distances comprises driving the autofocus lens to each of the one or more of the focal distances in an order determined to minimize time that the autofocus lens is sweeping.

Example 14. A user equipment comprising: a sensor that generates sensor data; a camera with an autofocus lens; and at least one processor configured to perform any of the methods of the examples 1-13.

Example 15. A computer-readable storage medium comprising instructions that, when executed, configure at least one processor of a user equipment to perform any of the methods of the examples 1-13.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
capturing a plurality of buffer images of a field-of-view of a camera;
storing the buffer images at an image buffer;
determining a set of focal distances between the camera and objects-of-interest in the field-of-view;
inferring a plurality of segments in the field-of-view, each segment of the plurality of segments corresponding to a focal distance of the set of focal distances and defining a focus area within the field-of-view of the camera, the focus area corresponding with objects-of-interest at similar focal distances from the camera;
determining whether a buffer image of the buffer images captures the field-of-view of the camera at any of the focal distances in the set of focal distances;
responsive to determining that a buffer image captures the field-of-view of the camera at a first focal distance in the set of focal distances, sweeping an autofocus lens of the camera to one or more of the focal distances from the set of focal distances other than the first focal distance;

capturing sample images at one or more of the focal distances from the set of focal distances swept by the autofocus lens;

combining at least one of the sample images captured at the one or more focal distances swept by the autofocus lens with another image to produce an all-in-focus image; and outputting, for display, an indication of the all-in-focus image.

2. The method of claim 1, wherein combining at least one of the sample images captured at the one or more focal distances swept by the autofocus lens with the other image to produce the all-in-focus image further comprises:

combining one of the sample images with one of the buffer images.

3. The method of claim 1, wherein combining at least one of the sample images captured at the one or more focal distances swept by the autofocus lens with the other image to produce the all-in-focus image further comprises:

combining a second sample image with the other image to produce the all-in-focus image, wherein the second sample image is different than the at least one of the sample images being combined to produce the all-in-focus image.

4. The method of claim 1, further comprising:

obtaining sensor data, from at least one of a depth sensor, a contrast sensor, or a phase-detection-sensor.

5. The method of claim 4, wherein determining a set of focal distances between the camera and objects-of-interest in the field-of-view is performed utilizing the sensor data.

6. The method of claim 5, wherein determining, based on sensor data, the set of focal distances between the camera and objects-of-interest in the field-of-view comprises:

generating a depth map defining the set of focal distances between the camera and the objects-of-interest in the field-of-view of the camera.

7. The method of claim 4, wherein inferring a plurality of segments in the field-of-view is performed utilizing the sensor data.

8. The method of claim 1, wherein combining the at least one of the sample images captured at the one or more focal distances swept by the autofocus lens with the other image to produce the all-in-focus image further comprises:

layering the at least one of the sample images captured at the one or more focal distances swept by the autofocus lens with the other image; and adjusting an alpha-channel of each of the sample images to control transparency or opacity and sharpen areas or objects-of-interest at each of the set of focal distances.

9. The method of claim 1, wherein combining the at least one of the sample images captured at the one or more focal distances swept by the autofocus lens with the other image to produce the all-in-focus image further comprises:

extracting a portion of the at least one of the sample images captured at the one or more focal distances swept by the autofocus lens;

extracting a portion of the other image; and arranging the portion of the at least one of the sample images captured at the one or more focal distances swept by the autofocus lens adjacent to the portion of the other image in producing the all-in-focus image.

10. The method of claim 1, wherein sweeping the autofocus lens of the camera to the one or more of the focal distances from the set of focal distances comprises:

prior to driving the autofocus lens to a second focal distance of the one or more of the focal distances, driving the autofocus lens to a second focal distance of the one or more of the focal distances for a sufficient time to capture the sample image at the second focal distance.

11. A method comprising:

capturing a plurality of buffer images of a field-of-view of a camera;

storing the buffer images at an image buffer;

generating a depth map, the depth map defining focal distances between the camera and objects-of-interest in the field-of-view;

segmenting the depth map into a set of focal distances, each focal distance of the set of focal distances corresponding to a different segment of a plurality of segments, each segment of the plurality of segments corresponding to a focal distance of the set of focal distances and defining a focus area within the field-of-view of the camera, the focus area corresponding with objects-of-interest at similar focal distances from the camera;

determining whether a buffer image of the buffer images captures the field-of-view of the camera at any of the focal distances in the set of focal distances;

responsive to determining that a buffer image captures the field-of-view of the camera at a first focal distance in the set of focal distances, sweeping an autofocus lens of the camera to one or more of the focal distances from the set of focal distances other than the first focal distance;

capturing sample images at one or more of the focal distances from the set of focal distances swept by the autofocus lens;

combining at least one of the sample images captured at the one or more focal distances swept by the autofocus lens with another image to produce an all-in-focus image; and outputting, for display, an indication of the all-in-focus image.

12. The method of claim 11, wherein combining at least one of the sample images captured at the one or more focal distances swept by the autofocus lens with the other image to produce the all-in-focus image further comprises:

combining one of the sample images with one of the buffer images.

13. The method of claim 11, wherein combining at least one of the sample images captured at the one or more focal distances swept by the autofocus lens with the other image to produce the all-in-focus image further comprises:

combining a second sample image with the other image to produce the all-in-focus image, wherein the second sample image is different than the at least one of the sample images being combined to produce the all-in-focus image.

14. The method of claim 11, further comprising:

obtaining sensor data, from at least one of a depth sensor, a contrast sensor, or a phase-detection-sensor; and at least one of:

determining a set of focal distances between the camera and objects-of-interest in the field-of-view is performed utilizing the sensor data; or inferring a plurality of segments in the field-of-view is performed utilizing the sensor data.

15. The method of claim 14, wherein determining, based on sensor data, the set of focal distances between the camera and objects-of-interest in the field-of-view comprises:

generating a depth map defining the set of focal distances between the camera and the objects-of-interest in the field-of-view of the camera.

16. A method comprising:

generating a depth map of a field-of-view of a camera, the depth map defining focal distances between a camera and objects-of-interest in the field-of-view of the camera;

based on at least one buffer image of the field-of-view of the camera, sweeping an autofocus lens of the camera to one or more of the focal distances defined by the depth map;

capturing a sample image at each of the focal distances swept by the autofocus lens, each captured sample image comprising an in-focus portion at the focal distance swept by the autofocus lens;

producing an all-in-focus image by combining together the in-focus portions of the captured sample images with at least one portion of the at least one buffer image of the field-of-view of the camera; and outputting, for display, an indication of the all-in-focus image produced.

17. The method of claim 16, further comprising:

obtaining sensor data, from at least one of a depth sensor, a contrast sensor, or a phase-detection-sensor; and at least one of:

determining a set of focal distances between the camera and objects-of-interest in the field-of-view is performed utilizing the sensor data; or inferring a plurality of segments in the field-of-view is performed utilizing the sensor data.

18. The method of claim 17, wherein determining, based on sensor data, the set of focal distances between the camera and objects-of-interest in the field-of-view comprises:

generating a depth map defining the set of focal distances between the camera and the objects-of-interest in the field-of-view of the camera.

* * * * *